United States Patent [19]
Johnson et al.

[11] Patent Number: 5,761,854
[45] Date of Patent: Jun. 9, 1998

[54] COLLAPSIBLE PORTABLE CONTAINERIZED SHELTER

[75] Inventors: Brian D. Johnson; Glen V. Thorne, both of Burnaby, Canada

[73] Assignee: Weatherhaven Resources, Ltd., British Columbia, Canada

[21] Appl. No.: 532,783

[22] PCT Filed: Jul. 6, 1994

[86] PCT No.: PCT/CA94/00384

§ 371 Date: Oct. 5, 1995

§ 102(e) Date: Oct. 5, 1995

[87] PCT Pub. No.: WO95/03457

PCT Pub. Date: Feb. 2, 1995

[30] Foreign Application Priority Data

Jul. 19, 1993 [CA] Canada ................ 2100845

[51] Int. Cl.[6] ............................. E04B 1/346
[52] U.S. Cl. ............... 52/69; 52/64; 52/79.5; 52/68; 52/646; 135/116
[58] Field of Search ............... 52/64, 66, 69, 52/67, 71, 79.1, 79.5, 79.7, 79.9, 646; 135/116, 121, 126, 137, 143, 149, 150

[56] References Cited

U.S. PATENT DOCUMENTS

| | | | |
|---|---|---|---|
| 3,070,399 | 12/1962 | Bartlett | 52/69 |
| 3,095,616 | 7/1963 | Bigelow | 52/64 |
| 3,226,890 | 1/1966 | Flajole | 52/69 |
| 3,445,134 | 5/1969 | Pair et al. | 52/64 |
| 3,461,890 | 8/1969 | Goodrich | |
| 3,514,147 | 5/1970 | Forsyth et al. | 52/64 |
| 3,633,324 | 1/1972 | Cuylits | 52/66 |
| 3,830,541 | 8/1974 | Bowman et al. | 52/64 X |
| 4,599,829 | 7/1986 | DiMartino, Sr. | |
| 4,603,518 | 8/1986 | Fennes | 52/64 X |
| 4,912,892 | 4/1990 | Jurgensen | 52/69 |
| 5,038,517 | 8/1991 | Talbott | 52/64 X |
| 5,054,295 | 10/1991 | Goulooze | 52/64 X |
| 5,185,973 | 2/1993 | Oldani | 52/64 |
| 5,237,784 | 8/1993 | Ros | 52/69 X |
| 5,283,993 | 2/1994 | Sprung | 52/64 |
| 5,319,895 | 6/1994 | Ray | 52/64 X |
| 5,398,463 | 3/1995 | Wright | 52/64 X |
| 5,417,468 | 5/1995 | Baumgartner et al. | 52/69 X |
| 5,444,944 | 8/1995 | Roelofsz | 52/64 |

FOREIGN PATENT DOCUMENTS

| | | |
|---|---|---|
| 1030136 | 6/1953 | France. |
| 2535658 | 5/1984 | France. |
| PCT/FR80/00145 | 4/1981 | WIPO. |

*Primary Examiner*—Carl D. Friedman
*Assistant Examiner*—Beth A. Aubrey
*Attorney, Agent, or Firm*—Klarquist Sparkman Campbell Leigh & Whinston, LLP

[57] ABSTRACT

Currently portable industrial camp shelters will be either wood frame construction or fabric tents. The former have restriction on size and require special skills and equipment to install on site. The latter require plumbing and electrical installation to be installed on site. The present invention combines the advantages of frame structures and tents in a portable collapsible shelter by modifying standard shipping container structures to provide fold-down side walls which extend the floor space of the container and are provided with a retractable fabric cover to enclose the extended space.

16 Claims, 9 Drawing Sheets

1

COLLAPSIBLE PORTABLE CONTAINERIZED SHELTER

TECHNICAL FIELD

The invention relates to the field of portable shelters and more particularly collapsible portable shelters having both rigid frame and flexible fabric sections which collapse to a rigid shipping container.

BACKGROUND ART

The modular building industry provides re-locatable structures for a variety of commercial and industrial uses, such as portable offices, portable schools and industrial camps. Portable industrial camps are generally utilized for projects of short duration or projects which are sufficiently remote that site construction is uneconomical. Currently portable industrial camp shelters will be either wood frame construction or fabric tents.

An advantage of wood frame construction is that all of the building and its internal subsystems can be constructed in a manufacturing plant. However restrictions on the size of such structures which can be transported dictates that these units be combined together on site to provide a structure of sufficient size. The prefabricated units are heavy, so special equipment and tradesmen are required on site to unload the units from trucks and place them on foundations.

Fabric structures such as tents have the advantage that they are much lighter than wood frame structures and can be collapsed or folded to a fraction of the volume of the equivalent wood frame building for shipping purposes. However such structures must be assembled on site and any electrical or mechanical subsystems which are required must be installed on site by an experienced crew.

Certain prior art building systems have used shipping containers as modular building blocks for pre-fabricated structures. U.S. Pat. No. 4,599,829 issued Jul. 15, 1986 to Tandemloc, Inc. discloses a system for building prisons or similar large structures by connecting shipping container units. Again in these systems special equipment and tradesmen are required on site to unload the units and stack them on the structure to provide a building of sufficient size. U.S. Pat. No. 4,802,500 issued Feb. 7, 1989 to Davis et al. discloses a portable building structure in which clamshell like containers carry a fabric roof covering. Four of the container units combine to form the side walls and floor of a structure over which a fabric roof is stretched. This design however is not as well adapted for shipping as a standard ISO container, and electrical and mechanical systems are not pre-installed.

DISCLOSURE OF INVENTION

The present invention combines the advantages of rigid and fabric portable structures in a hybrid collapsible portable structure which in its collapsed state forms a standard shipping container for ease of transport. The present invention modifies standard shipping container structures to provide one or more fold-down side walls which extend the floor space of the container and are provided with a retractable fabric cover to enclose the extended space. The invention provides a portable, collapsible shelter comprising a rigid, hollow container having the dimensions and characteristics of a standard ISO shipping container, having opposed rectangular vertical sides, and rectangular horizontal top and bottom. At least one of the vertical sides of the container is hinged along the lower edge thereof to pivot between a closed vertical position and an open horizontal position. Means is also provided for releasably securing the hinged vertical side in the vertical position and for releasably maintaining the hinged vertical side in the horizontal position. A flexible fabric cover is adapted to be extended above the hinged vertical side while the hinged vertical side is in its lowered horizontal position, and means is provided for supporting the fabric cover above the hinged vertical side while the hinged vertical side is in the lowered horizontal position.

BRIEF DESCRIPTION OF DRAWINGS

In drawings which illustrate a preferred embodiment of the invention.

BEST MODE(S) FOR CARRYING OUT THE INVENTION

Figure 1:
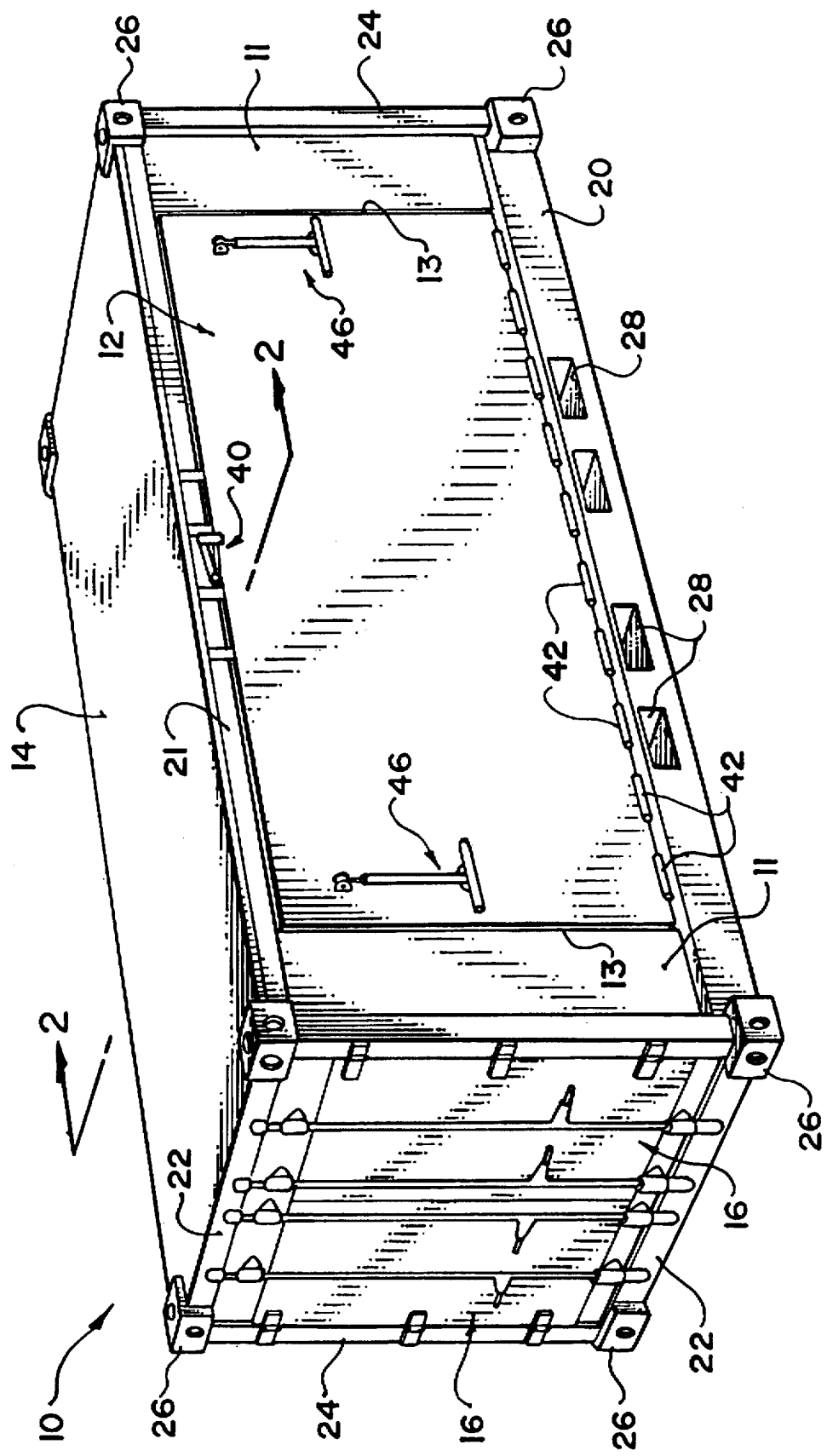
FIG. 1 is a perspective view of the invention in collapsed state ready for shipping.

With reference to FIG. 1, in its collapsed state the present invention (which is referred to by the applicant as a "Mobile Expanding Containerized Camp") forms a shipping container 10 conforming to ISO (International Organization for Standardization) standards, of dimensions either 6.1 m. (20 feet) or 12.2 m. (40 feet) in length and 2.44 m. (8 feet) in width and 2.6 m. (8.5 feet) or 2.9 m. (9.5 feet) in height. The width dimension may be as great as 3.05 m. (10 feet). The ISO and related standards applicable to the construction of the invention may be found in the following publications:

ISO 1161 Series 1 Freight containers—corner fittings—specification

ISO 1496-1 Series 1 freight containers—Specification and testing—Part 1: General cargo containers for general purposes ISO standards 9000 through 9004—quality standards International Union of Railways (U.I.C.)

Transport International des Routiers (T.I.R.)

Convention for Safe Containers (C.S.C.)

The container 10 has rigid sides 11 from which are cut out pivoting side walls 12, roof 14 and ends 16, all of which surfaces may be insulated. While both sides are cut out in the preferred form of the invention, only one of the sides could be so cut out. Side wall cut-outs 12 are preferably 5.8 m. (19 feet) by 2.13 m. (7 feet) in dimension for a 6.1 m. (20 foot) container, with two separate 5.8 m. (19 foot) by 2.13 m. (7 foot) sections for the 12.2 m. (40 foot) container. Metal bottom side rail 20, top side rail 21, metal cross members 22, metal vertical rails 24 and corner fittings 26 provide reinforcement of the structure curing shipping. Pockets 28 are provided to receive the forks of a fork lift vehicle. A flooring 19 is provided on the bottom 18 of the container. Plumbing, mechanical and electrical systems can be pre-installed in the floor or walls or elsewhere in the container 10.

Preferably roof 14 is a standard container roof of mild steel or Corten. Corner fittings 26 are manufactured of cast steel, and other frame members are of mild steel. End walls 16 and side walls 11 are formed of sections of steel panels surrounding rigid insulation foam. Flooring 19 is preferably plywood with a vinyl top layer, while the upper surface of side walls 15 is plywood with a linoleum upper layer. Floor and wall insulation is rigid polyurethane or polystyrene foam while fibreglass batt insulation is used for the roof 14.

Figure 3:
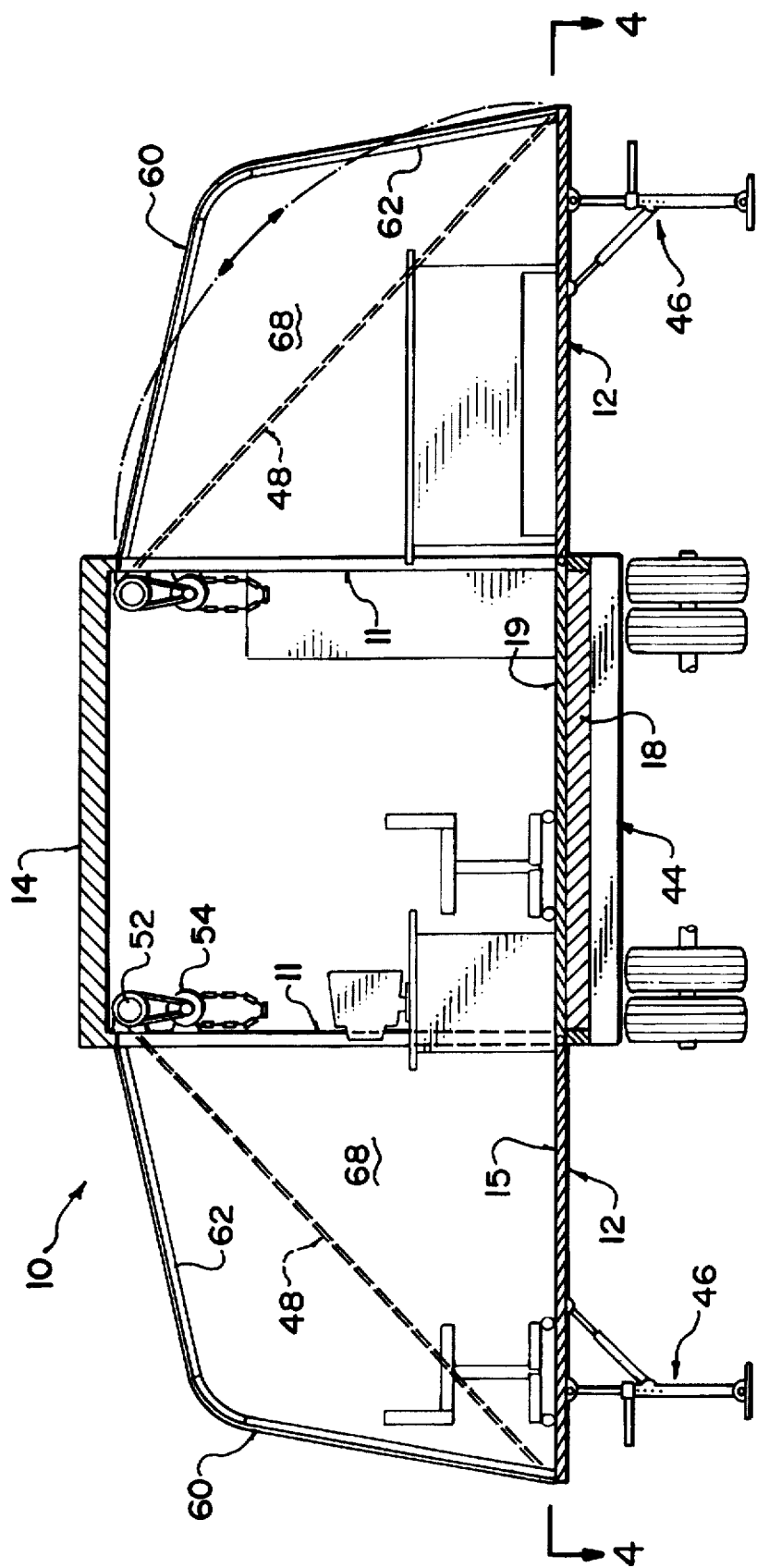
FIG. 3 is a cross-sectional view taken along lines 2—2 of FIG. 1 of the invention in assembled state mounted on a flat bed trailer.
Figure 5:
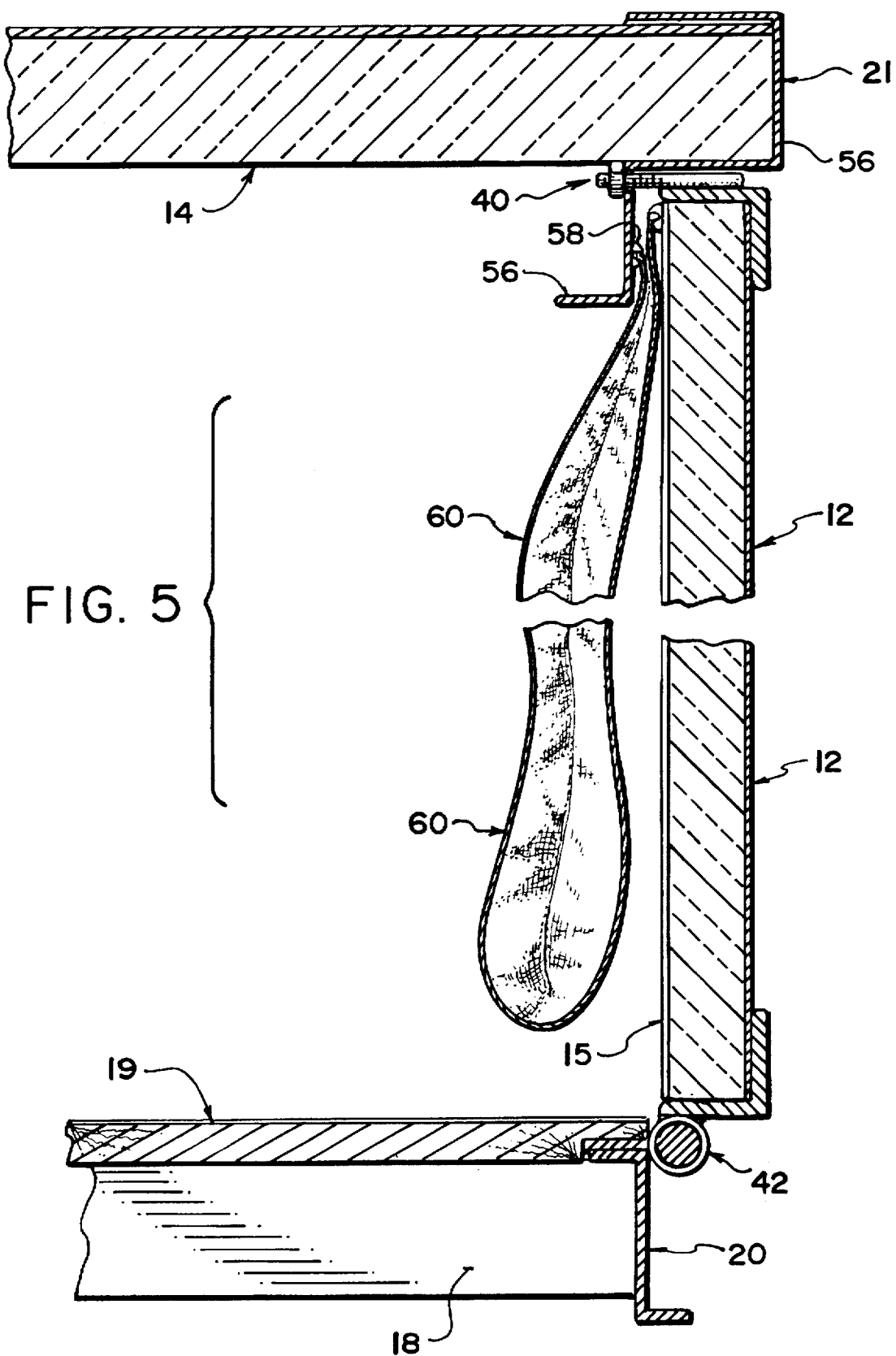
FIG. 5 is a detail of the hinge and winch assembly of the invention.
Figure 6:
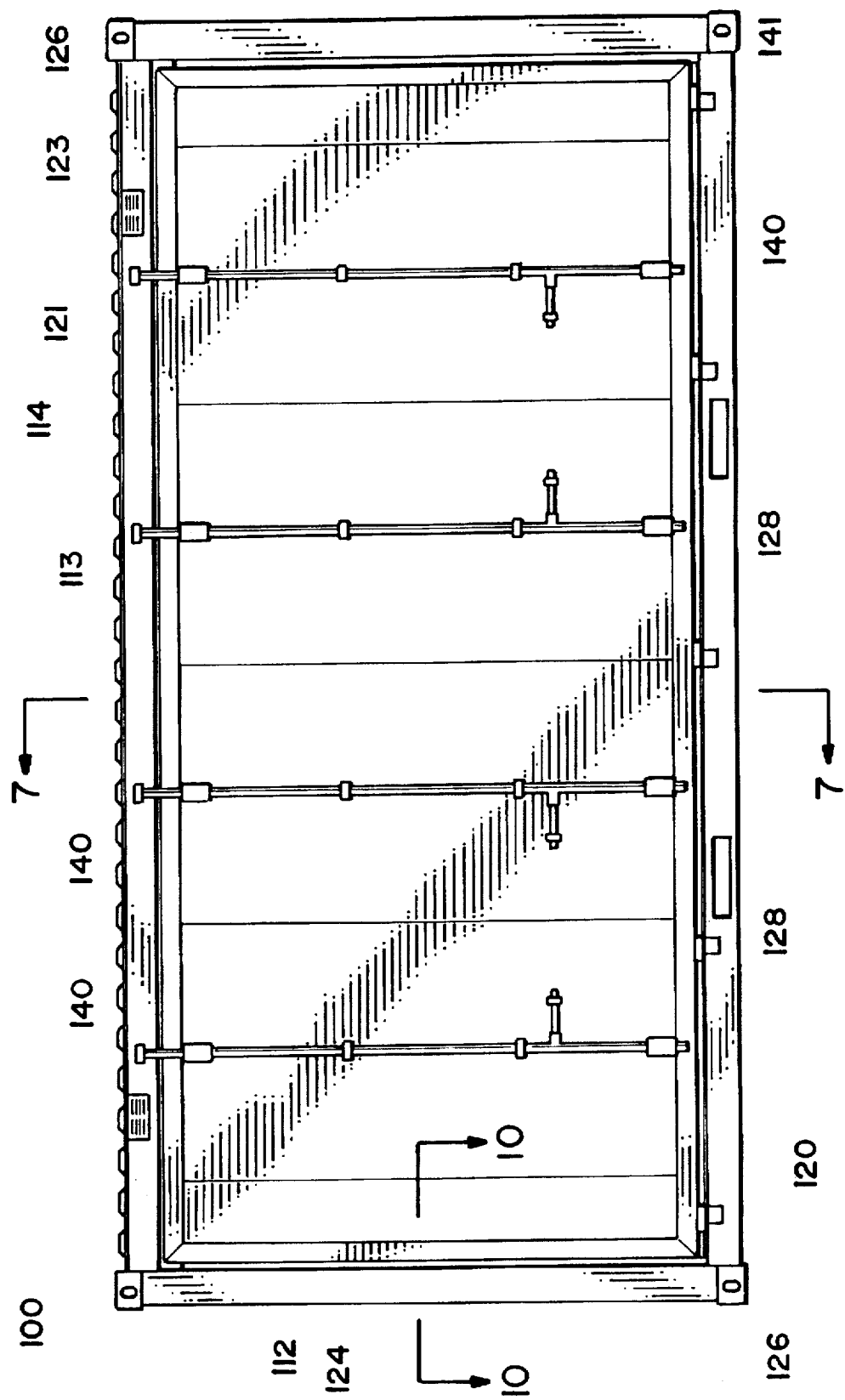
FIG. 6 is a side view of a second embodiment of the invention in collapsed state ready for shipping.
Figure 7:
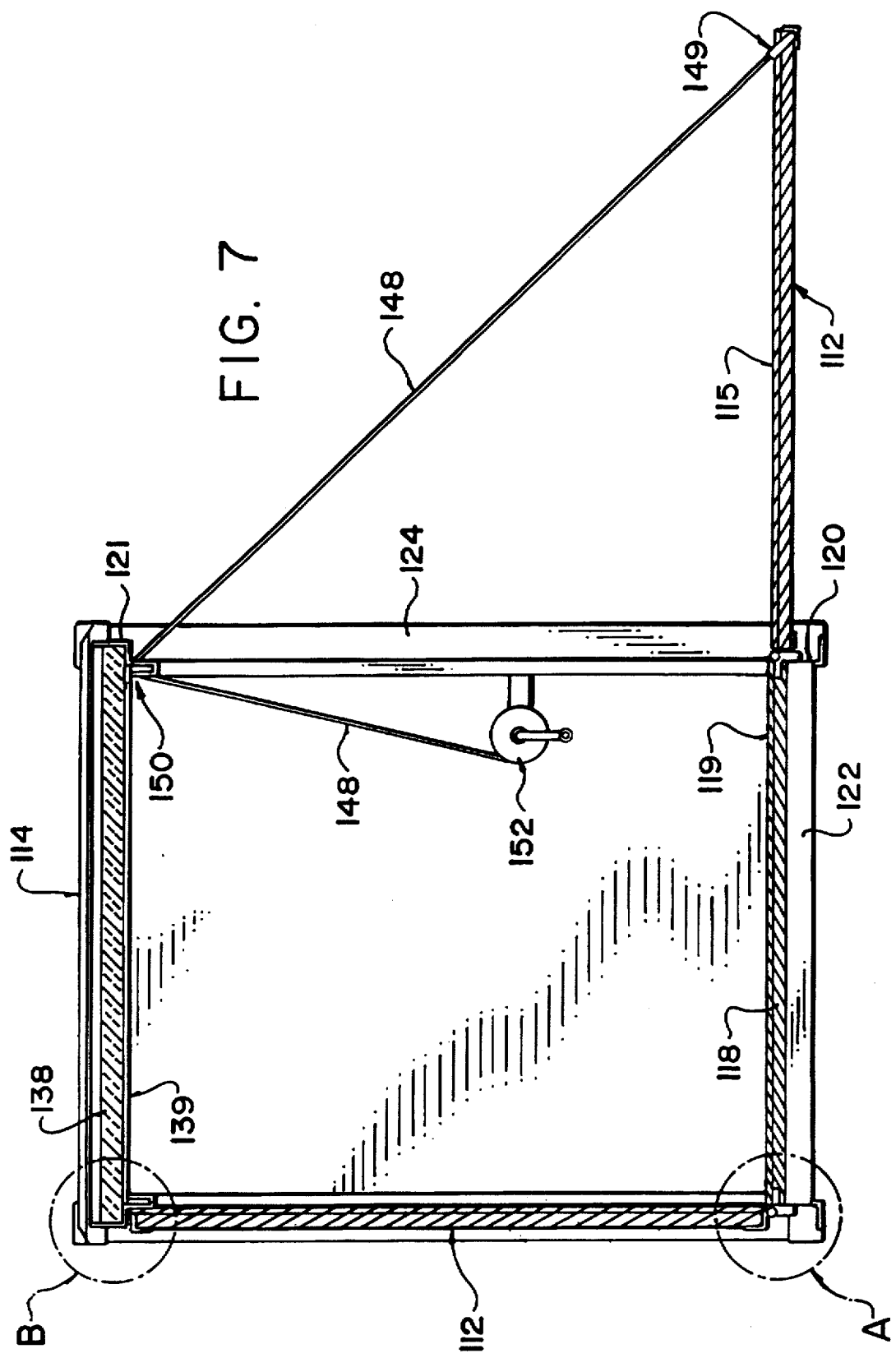
FIG. 7 is a cross-sectional view taken along lines 7—7 of FIG. 6 of the second embodiment of the invention in open condition.

The two side walls 12 are hinged along the base thereof at 42 to allow them to pivot from a vertical position as shown in FIG. 1, where it is retained by a quick release latching mechanism 40, to the horizontal position shown in FIG. 3. Latching mechanism 40 may be located inside or outside the container and locks the side walls 12 in a vertical position to provide a rigid structure for shipping purposes which can be lifted through pockets 28 or the ISO corner fittings 26. Latching mechanism 40 may be a nut and bolt arrangement as shown in FIG. 5, an alignment pin, pivoting handle or other suitable arrangement.

Figure 2:
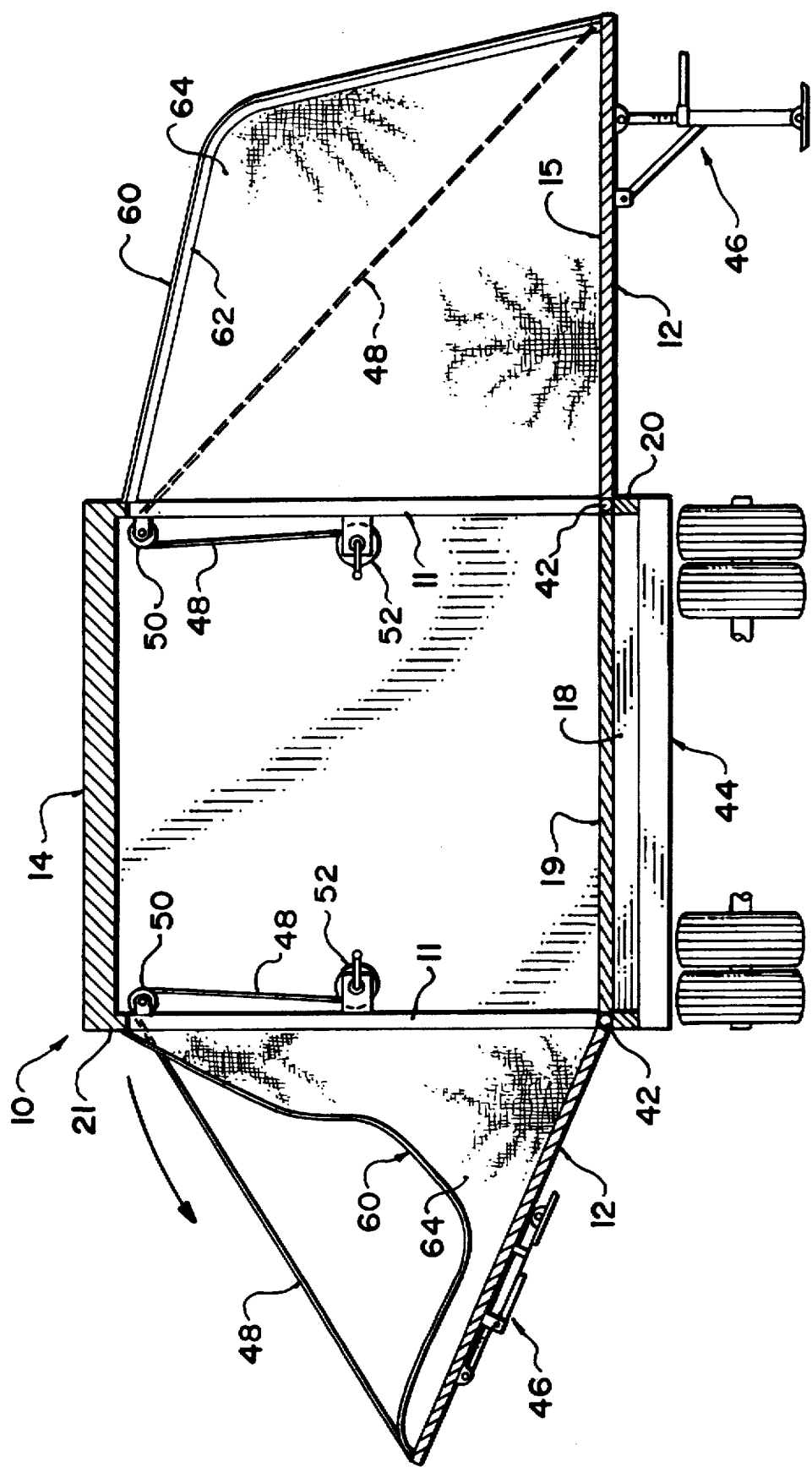
FIG. 2 is a cross-sectional view taken along lines 2—2 of FIG. 1 of the invention in partly assembled state mounted on a flat bed trailer.
Figure 4:
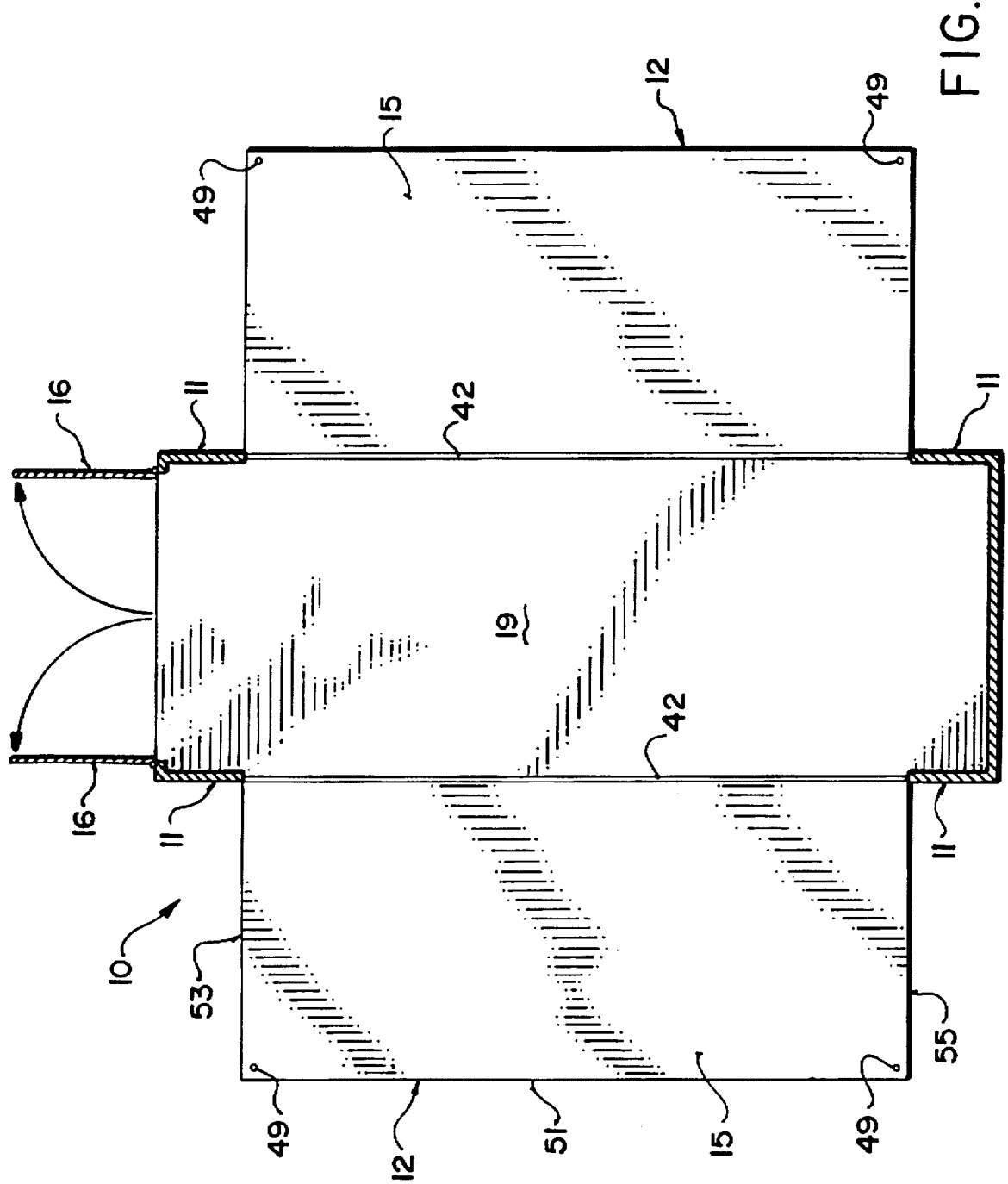
FIG. 4 is a cross-sectional view taken along lines 4—4 of FIG. 3.

As shown in FIG. 2 and 3, preferably container 10 is mounted on a flat bed trailer 44 for transporting and acting as the foundation on site. As shown in FIG. 2 and FIG. 3, two or more levelling jacks 46 are pivotally attached to the outside of sides 12 to lock into position and support and level the side walls 12 when they are in a lowered position. Jacks 46 are preferably collapsible to present the minimum projection during shipping and are latched to the sides of walls 12 when in the vertical shipping position, or alternatively would be removable for shipping. As shown in FIG. 4, the structure in its opened configuration has a floor space slightly less than 3 times the floor space of the container.

If a flat bed trailer is not used, the invention can be mounted on a concrete foundation or footing, using a forklift or crane, or directly on the ground. If mounted on the ground, rather than using levelling jacks, wood or timber blocking or the like can be used to provide level support for sides 12.

To facilitate the raising and lowering of sides 12, wire ropes 48, preferably two per side, are attached to the upper corners 49 of sides 12 and run over two pulleys 50 on each side and down to winches 52 which are attached to the fixed side walls 11 of the container. Winch 52 may be hand operated by a handle as shown in FIG. 2, or may be operated by an electric motor 54 as shown in FIG. 3, where the wire rope is directly wound on the winch drum rather than using an intermediate pulley. The winch has a braking mechanism to prevent sudden slippage of the wire rope. The wire rope preferably runs on the outside of the fabric cover 60 described below. Where the winches are run by electric motor it is preferred to have one winch per side to which both wire ropes 48 are connected using a series of pulleys.

A fabric cover 60, made of a waterproof PVC-coated polyester or the like, which may be insulated, is attached along edges 51, 53, 55 of side wall 12 and along strip 58 which is secured to flange 56 (FIG. 5) which is in turn fixed to container roof 14 and vertically extends down the edges 13 shown in FIG. 1. The shape and area of the fabric cover 60 is such that when sides 12 are lowered to the horizontal position, fabric cover 60 provides a water-proof seal over the area of the container which is thereby opened, and rigid or semi-rigid arc-shaped metal frames or beams 62 can be installed by pushing out the fabric cover to provide a supporting frame to support the fabric 60, thus forming a tight outer cover for a sheltered space 68 with ends 64 of the space also enclosed. Metal frames 62 are preferably installed under the fabric cover 60, with the lower ends of frames 62 attached at the outer corners of sides 12 (with possibly additional members at spaced locations along side 51), and the upper ends being attached at flange 56. Frame members 62 may also be constructed of other suitable materials such as plastic, graphite, or fibreglass and may take some other appropriate shape rather than an arc. Frame members 62 may also consist of one or more pieces for ease of transportation, for example each may consist of a lower base arch piece and an upper roof arch piece. Horizontal bracing members can be attached between the arched metal frame members 62. Fabric cover 60 may be provided with doors for entrance and exit purposes and/or windows and screens, as in existing tent designs. A standard container door 16 may also be used as an entrance/exit.

To collapse the structure to its shipping configuration, the metal frames 62 are removed and side walls 12 are raised by winches 52. Fabric cover 60 is loosely tucked into container 10 and side walls 12 are latched in the vertical position. This can all be accomplished by unskilled personnel. The container can then be shipped by truck, rail, ship, helicopter or airplane as a standard shipping container.

FIG. 6 through FIG. 11 illustrate a slightly modified second embodiment of the invention in which the levelling jacks 46 are provided separately of the pivoting side walls. The container 100 shown in FIG. 6 has side walls 112 which pivot downwardly as a complete side wall unit about hinge pipe 140 which rotates in hinges 141. Side walls 112 are secured in the closed position shown in FIG. 6 by anti-racking locks 140 as used in existing containers. Roof 114, bottom side rail 120, top side rail 121, metal cross members 122, metal vertical rails 124 and corner fittings 126 are provided as in the previous embodiment. Pockets 128 are provided to receive the forks of a fork lift vehicle. Vents 123 are provided in top side rail 121. A standard door 116 is provided in one or both of the end panels 117. Flooring 115 and 119 is provided on the bottom 118 of the container and the inner surface of side walls 112 as in the previous embodiment.

In the second embodiment, the levelling jacks are not secured to walls 112, but rather are provided separately, preferably three jacks per side, with support pads on the top of each jack to contact the surface of wall 112. In this embodiment, one hand-operated winch 152 is provided for each side wall, at opposite ends of the container, and a single cable 148 is provided for each side wall. Cable 148 runs from winch 152 up to and through a hole 150 in upper rail 121, diagonally down to a first upper corner or side wall 112 where it enters an elbow 149 of a swivelling pipe/cable guide running along upper edge 113 of side walls 112, and then proceeds diagonally up the opposite end for attachment to upper rail 121.

Figure 11:
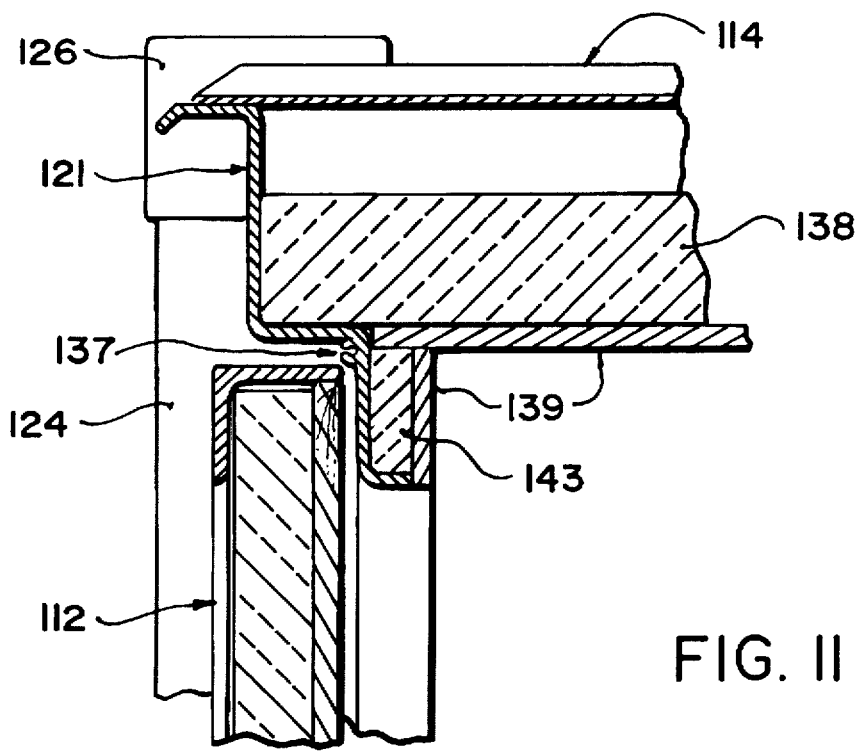
FIG. 11 is a detail of the upper side area B in FIG. 7.
Figure 8:
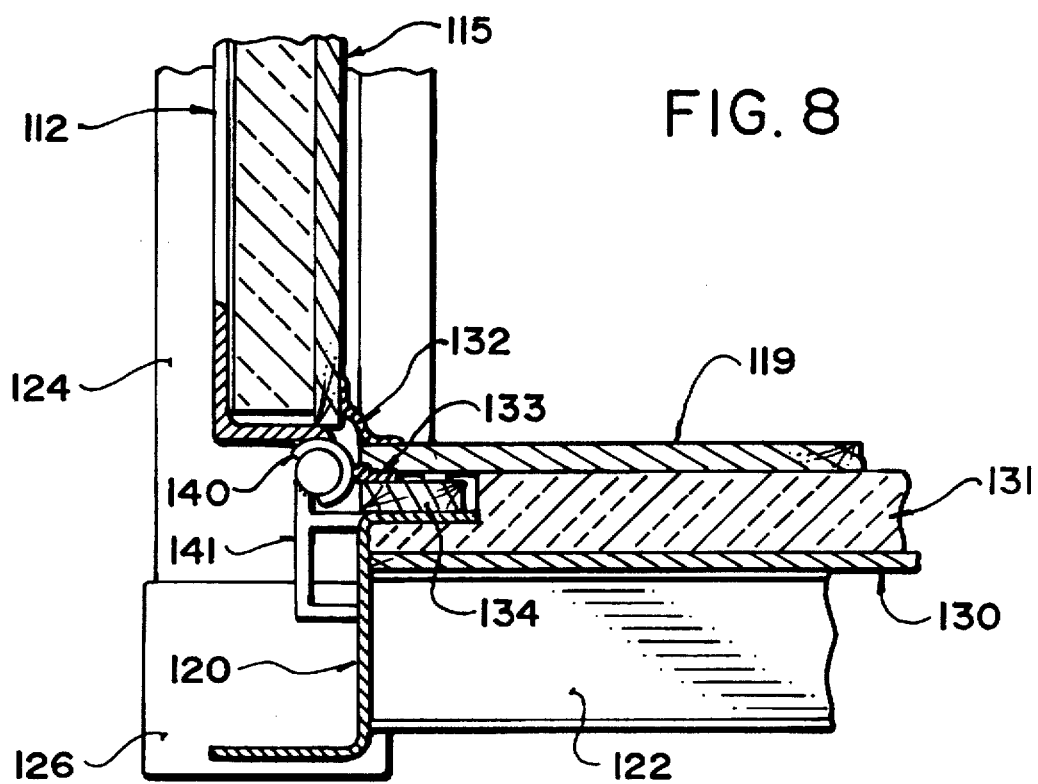
FIG. 8 is a detail of the hinge area A in FIG. 7.
Figure 9:
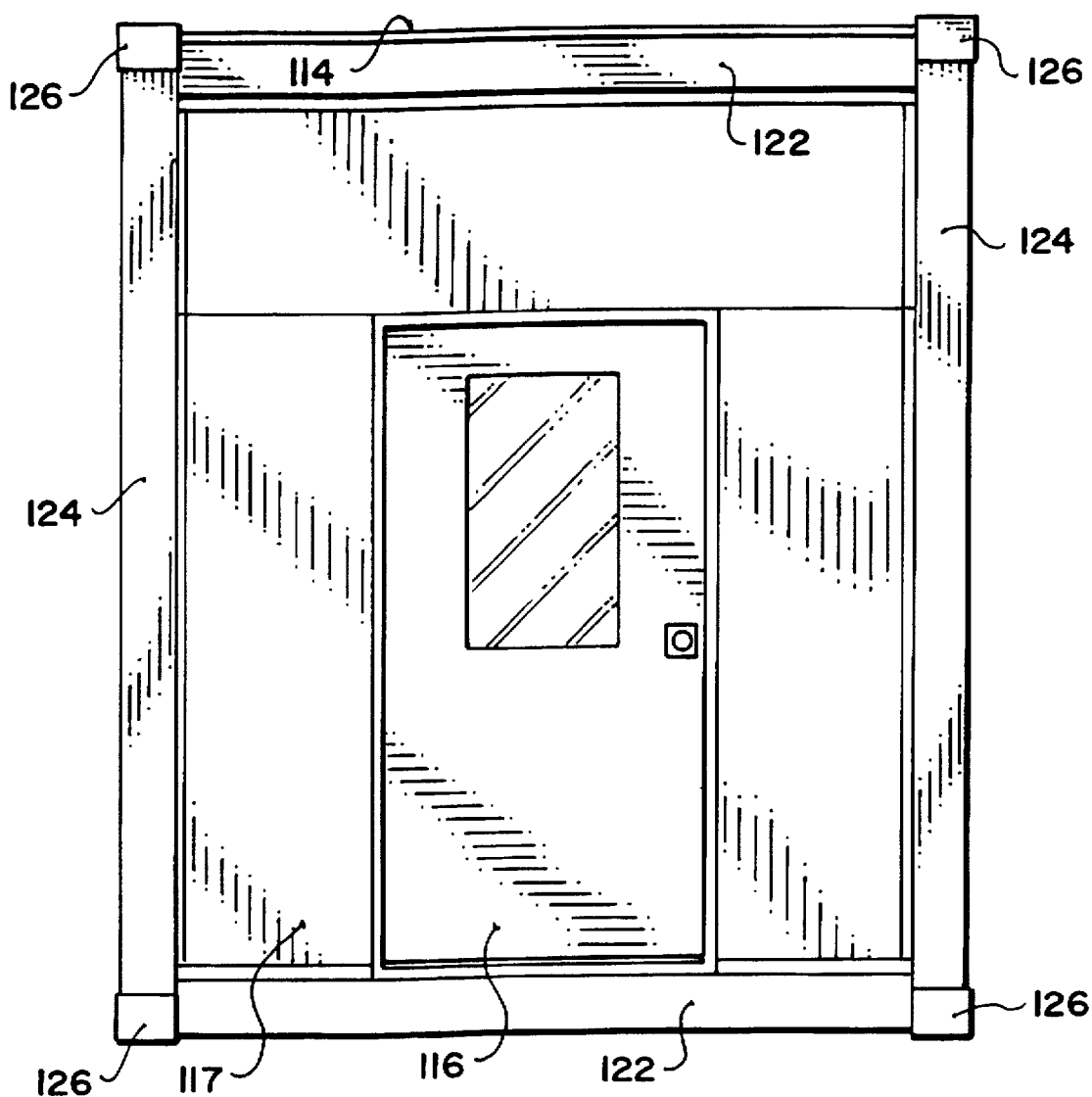
FIG. 9 is an end view of a second embodiment of the invention in collapsed state ready for shipping.
Figure 10:
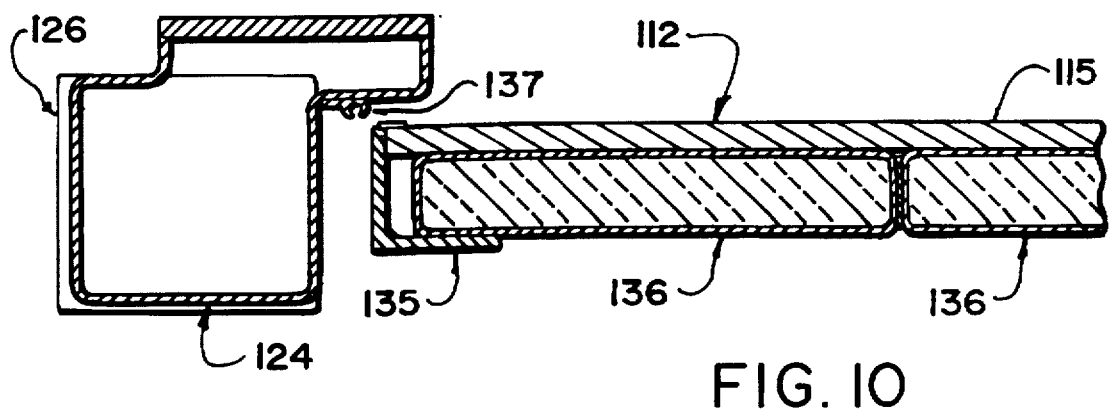
FIG. 10 is a cross-sectional view of the side panels taken along lines 10—10 of FIG. 6 of the second embodiment of the invention.

The hinge construction is shown in detail in FIG. 8. Hinge 141 is secured to lower rail 120. Floor 118 consists of a plywood layer 130 with galvanized sheet metal underneath, and a layer 131 of rigid foam insulation. A strip of neoprene seal 132 is secured to and seals between flooring 119 and 115. A draft seal 133 is also provided between hinge 141 and a piece of lumber 134 on rail 120. As illustrated in FIG. 10, side wall 112 has a frame of angle iron 135 secured to plywood and linoleum layer 115 and side panels 136 which are hollow rectangular steel panels filled with rigid insulation foam, rivetted together with adjacent panels sandwiching a strip of butyl tape. An awning wrack 137 is provided around the edges of the side wall opening to secure the fabric cover (not shown). As shown in FIG. 11, batt insulation 138 is provided in the ceiling between roof 114 and ceiling panels 139. Rigid foam insulation is also provided at 143.

What is claimed is:

1. A portable, collapsible shelter comprising:
   a) a rigid, hollow container having opposed ends, opposed vertical sides, and a horizontal top and bottom, said ends, sides, top and bottom being secured to form a rigid container having the external dimensions and corner fitting locations which satisfy the standards for ISO Series 1 freight containers;
   b) at least one of said vertical sides comprising a pivoting wall portion hingedly connected to said vertical side along the lower edge of said pivoting wall portion to pivot between a closed vertical position and an open horizontal position, said pivoting wall portion having an outer edge, and whereby an opening is formed in said vertical side circumscribed by edges of said vertical side when said pivoting wall portion is in the horizontal position;
   c) means associated with said container and with said pivoting wall portion for releasably securing said pivoting wall portion in said vertical position;
   d) means adapted to support said pivoting wall portion for releasably maintaining said pivoting wall portion in said horizontal position;
   e) a flexible cover secured to said outer edge of said pivoting wall portion and secured to said container around said opening formed when said pivoting wall portion is in said lowered horizontal position, and adapted to be extended above said pivoting wall portion while said pivoting wall portion is in said lowered horizontal position; and
   f) means extending outwardly from said vertical side and above said pivoting wall portion when said pivoting wall portion is in said lowered horizontal position for supporting said fabric cover above said pivoting wall portion while said pivoting wall portion is in said lowered horizontal position.

2. The shelter of claim 1 wherein said means for releasably maintaining said pivoting wall portion in said horizontal position comprises levelling means (46).

3. The shelter of claim 2 wherein said levelling means comprises a jack.

4. The shelter of claim 1 further comprising means for raising and lowering said pivoting wall portion.

5. The shelter of claim 4 wherein said means for raising and lowering said pivoting wall portion comprises a cable connected to said pivoting wall portion and winching means.

6. The shelter of claim 1 wherein said means for supporting said fabric cover above said pivoting wall portion comprise rigid or semi-rigid beams attached to said container (10) at either end of said beams.

7. The shelter of claim 1 wherein said flexible cover is constructed from a fabric material.

8. The shelter of claim 1 wherein said flexible cover comprises an insulated fabric.

9. The shelter of claim 1 wherein a door is provided in one of said opposed ends of said container.

10. The shelter of claim 2 wherein said levelling means comprises wood blocks.

11. The shelter of claim 1 wherein said means for releasably securing said pivoting wall portion in said vertical position comprises a nut and bolt.

12. The shelter of claim 1 wherein said means for releasably securing said pivoting wall portion in said vertical position comprises latching means.

13. The shelter of claim 1 wherein said flexible cover is secured to an awning track around said opening.

14. The shelter of claim 1 wherein said flexible cover is secured to a flange secured to said container around said opening.

15. The shelter of claim 1 wherein said means for supporting said fabric cover above said pivoting wall portion comprises a rigid or semi-rigid frame secured at a lower end thereof to said pivoting wall portion and at an upper end thereof to said container.

16. A portable, collapsible shelter comprising:
   a) a rigid, hollow container having opposed ends, opposed vertical sides, and a horizontal top and bottom, said ends, sides, top and bottom being secured to form a rigid container having the external dimensions and corner fitting locations which satisfy the standards for ISO Series 1 freight containers;
   b) at least one of said vertical sides comprising a pivoting wall portion hingedly connected to said vertical side along the lower edge of said pivoting wall portion to pivot between a closed vertical position and an open horizontal position, said pivoting wall portion having an outer edge, and whereby an opening is formed in said vertical side circumscribed by edges of said container when said pivoting wall portion is in the horizontal position;
   c) means associated with said container and with said pivoting wall portion for releasably securing said pivoting wall portion in said vertical position;
   d) means adapted to support said pivoting wall portion for releasably maintaining said pivoting wall portion in said horizontal position;
   e) a flexible fabric cover secured to said outer edge of said pivoting wall portion and secured to said container around said opening formed when said pivoting wall portion is in said lowered horizontal position, and adapted to be supported above said pivoting wall portion when said pivoting wall portion is in said lowered horizontal position, thereby forming an enclosed space above said pivoting wall portion open to the interior of said container when said pivoting wall portion is lowered to the horizontal position.

* * * * *